United States Patent [19]

Hertel

[11] 4,368,054
[45] Jan. 11, 1983

[54] COMPOSITIONS OF NITRO-ANILINES FOR PRODUCING AZO DYES ON FIBERS

[75] Inventor: Hasso Hertel, Mühlheim, Fed. Rep. of Germany

[73] Assignee: Hoechst Aktiengesellschaft, Fed. Rep. of Germany

[21] Appl. No.: 343,971

[22] Filed: Jan. 29, 1982

[30] Foreign Application Priority Data

Feb. 4, 1981 [DE] Fed. Rep. of Germany ....... 3103712

[51] Int. Cl.³ .................... D06P 1/12; D06P 67/00
[52] U.S. Cl. .......................................... 8/527; 8/564; 8/580; 8/649; 8/662; 8/667
[58] Field of Search ............... 8/527, 564, 8/649, 667

[56] References Cited

U.S. PATENT DOCUMENTS 3,332,938  7/1967  Mayhew et al. ................... 8/564
4,179,267 12/1979  Lacroix et al. .................... 8/564
4,331,442  5/1982  Uhlig et al. ........................ 8/564

FOREIGN PATENT DOCUMENTS 52-74088  6/1977  Japan .

*Primary Examiner*—A. Lionel Clingman
*Attorney, Agent, or Firm*—Connolly and Hutz

[57] ABSTRACT

Liquid compositions of nitro group-containing aniline compounds containing no sulfonic acid and/or carboxylic acid groups and having a melting point of below 140° C., especially those suitable for use as diazo component in ice color dyeing, which contain 20 to 70% of this nitro-aniline, 5 to 80 weight % of a castor oil oxethylated with 25 to 60 mols of ethylene oxide, and 5 to 65 weight % of N-methyl-pyrrolidone as solvent. By simply mixing these components clear solutions are obtained which can be diazotized within a few seconds by means of an aqueous sodium nitrite solution and thus give diazonium salt solutions free from residue. These diazonium salt solutions can be used in simple manner and very advantageously as developing baths or liquors for producing water-insoluble azo dyestuffs on the fiber according to the ice color technique.

8 Claims, No Drawings

COMPOSITIONS OF NITRO-ANILINES FOR PRODUCING AZO DYES ON FIBERS

The invention relates to the field of water-insoluble or practically water-insoluble nitro-aniline compounds which can be used as diazo components for producing water-insoluble azo dyestuffs on the fiber.

Halogen-containing aniline compounds which do not contain any sulfonic or carboxylic acid groups are used for example as diazo components in ice color dyeing for producing water-insoluble azo dyestuffs on the fiber. When they are used in this ice color dyeing in the form of their free bases or their salts of strong acids, for example as hydrochlorides or sulfates, and when the diazotization is carried out under the conditions as usual in the dyeing practice, ver turbid diazonium salt solutions are obtained which contain a large amount of residue and may cause serious trouble on dyeing. In order to overcome that, German Offenlegungsschrift No. 2,640,138 proposes compositions of such halogen-containing aniline compounds having a melting point of below 90° C., which contain as solvent an oxethylated castor oil having from 25 to 60 mols of ethylene oxide, and optionally a di- tri- or tetraethyleneglycol-monoalkyl ether; they allow to obtain in simple manner diazonium salt solutions free from residue and well suitable for ice color dyeing.

Such compositions must have an excellent storability at elevated temperatures (climate conditions of the tropics) as well as, generally, at low temperatures of about 0° C. or a few degrees below. For example, a composition containing 60 weight % of 4-chloro-2-aminotoluene, 25 weight % of oxethylated castor oil and 15 weight % of diethyleneglycol-monomethyl ether has a crystallization temperature of −7° C., while a composition containing 60 weight % of 5-chloro-2-aminotoluene, 25 weight % of oxethylated castor oil and 15 weight % of diethyleneglycolmonomethyl ether has a crystallization temperature of 0° C. By crystallization temperature, there is to be understood in this context that temperature at which the first crystals appear on slow cooling of the compositions. However, since crystal formation is very much inhibited in these solutions, partially crystallized compositions are used for determining the crystallization temperature which are slowly heated. The crystallization temperature is now defined as being that temperature at which the last crystals disappear. For practical use, the crystallization temperature of these compositions must be sufficiently low, so that the amine does not crystallize completely even in unheated storage rooms.

When trying to replace the halogen-containing aniline in the compositions of German Offenlegungsschrift No. 2,640,138 by a nitro-aniline compound, compositions having a considerably higher crystallization temperature are obtained. When preparing for example compositions as described in Examples 7 to 11 of the above German Offenlegungsschrift, while replacing the chloro-aniline compounds used there by corresponding nitro-aniline compounds, the final products are substantially crystallized at room temperature. For example, the crystallization temperature of a composition containing 40 weight % of 2-nitro-aniline, 30 weight % of an oxethylated castor oil and 30 weight % of ethyleneglycol-monomethyl ether is +19°; the composition is thus absolutely unfit for practical application.

In accordance with the present invention, there have been found compositions of nitro-aniline compounds containing no sulfonic and/or carboxylic acid groups and having a melting point of below 140° C., which are free from the above disadvantageous, and which contain (a) from 20 to 70, preferably 35 to 60, weight % of a nitro-aniline compound containing no sulfonic acid and/or carboxylic acid group and having a melting point of below 140° C.;

(b) from 5 to 80, preferably 5 to 40, especially 10 to 30, weight % of an oxethylated castor oil of from 25 to 60, preferably 30 to 45, mols of ethylene oxide; and (c) from 5 to 65, preferably 20 to 50, weight % of N-methylpyrrolidone.

Especially preferred are those of the above nitroaniline compounds which are or can be used in known manner as diazo components in ice color dyeing.

The compositions according to the invention can be diazotized in simple manner, rapidly and without residues; they are therefore excellently suitable for application in ice color dyeing for producing water-insoluble azo dyestuffs on the fiber. Their crystallization temperature is at such a low level that the nitro-aniline compounds do not crystallize even at storage temperatures which are usual in unheated storage rooms in the winter time.

The compositions of the invention may contain small amounts (of up to about 5 weight %) of further substances, for example alkohols having from 1 to 20 carbon atoms, ethyleneglycol, polyethyleneglycols having from 2 to 25 ethylene oxide units, propyleneglycol, polypropyleneglycols having from 2 to 10 propylene oxide units, the mono- and dialkyl ethers of these compounds (the alkyl radicals containing from 1 to 4 carbon atoms), water, and other pyrrolidones substituted at the nitrogen atom, such as N-ethyl-, N-propyl-, N-isopropyl-, N-butyl-, N-vinyl- or N-polyvinyl-pyrrolidone.

The compositions of the invention are viscous solutions which can be easily and safely used. When comparing, for example, the diazotization of a commercial powder containing 5-nitro-2-methylaniline with the diazotization of a liquid composition of 5-nitro-2-methylaniline in accordance with the invention, the latter composition brings an about 95% savings of time on diazotization (see Example 3 below). The diazonium salt solution obtained with the use of the liquid composition is clear and completely free from residue even after prolonged storage, while the diazonium salt solution on the basis of the powder is turbid and contains a substantial amount of insoluble substances. Moreover, addition of ice is not required for the diazotization of the liquid composition of the invention (in contrast to the powder), which is an essential advantage.

The nitro aniline compounds contained in the compositions of the invention are especially nitro-aniline compounds unsubstituted or substituted by one or two substituents selected from the group consisting of halogen such as chlorine or fluorine, alkyl having from 1 to 4 carbon atoms such as methyl or ethyl, alkoxy having from 1 to 4 carbon atoms such as methoxy or ethoxy, and trifluoromethyl, for example nitro-anilines substituted by chlorine, nitro-anilines substituted by methyl or ethyl, nitro-anilines substituted by methoxy or ethoxy, nitro-anilines substituted by chlorine and methyl, or nitro-anilines substituted by trifluoromethyl.

Preferred are especially those nitro-aniline compounds which correspond to the formula (1)

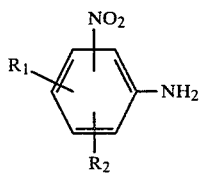

in which $R_1$ is hydrogen, chlorine or fluorine, trifluoromethyl, methyl, ethyl, methoxy or ethoxy, and $R_2$ is hydrogen, chlorine, methyl, ethyl, methoxy or ethoxy, the melting point of these nitro-anilines being below 140° C., as defined above.

Among the individual nitro-aniline compounds there may be cited especially 2-nitro-aniline (Colour Index C.I. No. 37025), 3-nitro-aniline (C.I. No. 37030), 4-chloro-2-nitro-aniline (C.I. No. 37040) 5-nitro-2-methyl-aniline (C.I. No. 37105) and 5-nitro-2- methoxy-aniline (C.I. No. 37130).

Recommended are especially those compositions of the invention which contain from 30 to 50 weight % of 3-nitro-aniline or 5-nitro-2-methyl-aniline or 5-nitro-2-methoxy-aniline, from 5 to 40, especially 5 to 20, weight % of the oxethylated castor oil, and from 30 to 65, especially 40 to 50, weight % of N-methylpyrrolidone.

The oxethylated castor oil contained in the compositions of the invention can be prepared for example according to German Patent Specification No. 694,178.

The compositions of the invention can be prepared by mixing under stirring the individual components, optionally with slight heating.

The compositions are applied preferably in ice color dyeing for producing water-insoluble azo dyestuffs on the fiber, where the diazo component dissolved in these compositions is converted to the diazonium salt by diazotization. The invention related therefore also to the application of the compositions according to the invention in ice color dyeing. For example, that application may be performed by stirring the composition into dilute hydrochloric acid and then adding rapidly an aqueous sodium nitrite solution while stirring. Diazotization is complete within a very short time, generally within a few seconds. The dilute acid may have a temperature of up to about 25° C., so that tap water, without cooling or addition of ice, can be generally used.

On the other hand, the aqueous sodium nitrite solution can be introduced first into the dilute hydrochloric acid, and the composition of the nitro-aniline is added thereafter. According to this operation mode, the diazotization temperature should advantageously not exceed 15° C.

Stirring during the preparation of the diazonium salt solution is generally ensured by means of a stirring motor. Due to the excellent capability of the compositions of the invention of being diazotized it is alternatively possible to diazotize them in amounts of up to 5 kg with manual stirring by means of a wooden paddle.

The clear diazonium salt solutions free from residue obtainable on the basis of the compositions of the invention allow to produce dyeings on the fiber according to the ice color technique which have clear shades and are distinguishable by very good fastnesses, especially an excellent fastness to rubbing.

In the chemical industry, diazotization is carried out in special closed reaction vessels which are provided with a cooling jacket, an efficient stirrer, a device for the dosage of the sodium nitrite solution and an exhaust device for nitrous fumes formed. Dye mills and printing companies, however, prepare the diazonium salt solutions required for ice color dyeing traditionally in simple, open vessels (buckets, troughs) without having the possibility of adding nitrite in a slow, continuous manner. Cooling can therefore be ensured only by addition of ice in pieces, and formation of nitrous fumes must be excluded. Under these conditions, the required clear diazonium salt solutions free from residue can be obtained only by means of special compositions which, for nitro-anilines, are now provided in accordance with the present invention.

The following examples illustrate the invention; parts and percentages being by weight unless otherwise stated.

EXAMPLE 1

(a) 400 Parts of 3- nitro-aniline, 100 parts of a reaction product of 1 mol of castor oil and 36 mols of ethylene oxide, and 500 parts of N-methyl-pyrrolidone were mixed with one another. A clear, yellow liquid having a crystallization temperature of −3° C. was obtained.

(b) This composition according to the invention can be diazotized easily according to the following method: 100 parts of this formulation were introduced into a mixture of 900 parts of water having a temperature of about 15° C. and 100 parts of an aqueous 32% hydrochloric acid, and stirred therein. A solution of 23 parts of sodium nitrite in about 40 parts of water was rapidly poured in with stirring. Diazotization was complete within a few seconds; a diazonium salt solution free from residue and having a good storability was the result.

(c) For obtaining a scarlet dyeing on cotton yarn, 250 parts of this diazonium salt solution was diluted with 4,750 parts of water; 40 parts of crystalline sodium acetate and 6 parts of a 60% aqueous acetic acid were dissolved therein. The solution so prepared was used as developing liquor on the following dyeing recipe:

A cross-wound bobbin containing 500 parts of cotton yarn which was previously wetted was treated in a dyeing apparatus first with 5,000 parts of a dyeing liquor having a temperature of about 20° C. and containing 18 parts of 2-hydroxynaphthalene-3-carboxylic acid-4′-chlorophenylamide, 50 parts of a 32% aqueous sodium hydroxide solution, 10 parts of an aqueous 30% formaldehyde solution and 12.5 parts of a commercial fatty acid/protein degradation product condensate. After 30 minutes, this liquor was let off, and the bobbin was intermediately rinsed for 5 minutes with a solution of 100 parts of sodium chloride and 7 parts of a 32% aqueous sodium hydroxide solution in 5,000 parts of water. After this bath had been pumped off, the bobbin was treated for 30 minutes with the above developing liquor. Subsequently, it was rinsed and soaped as usual first for 15 minutes at 60° C., and subsequently at 100° C. After rinsing thouroughly and drying, a full scarlet dyeing having good fastness properties was obtained.

EXAMPLE 2

(a) 400 Parts of 2-nitro-aniline were mixed with 300 parts of N-methyl-pyrrolidone and 300 parts of a reaction product of 1 mol of castor oil and 45 mols of ethylene oxide. The yellow solution which formed had a crystallization temperature of below −10° C.

(b) This composition according to the invention can be diazotized in simple manner according to the following method: 100 parts of this composition were stirred into a mixture of 1,000 parts of cold water and 105 parts of a 32% aqueous hydrochloric acid. To the emulsion thus formed, a solution of 22 parts of sodium nitrite in about 100 parts of water was rapidly added immediately thereafter. A light reddish, clear diazonium salt solution was obtained.

EXAMPLE 3

(a) 450 Parts of 5-nitro-2-methylaniline were mixed with 450 parts of N-methyl-pyrrolidone and 100 parts of a reaction product of 1 mol of castor oil and 42 mols of ethylene oxide. The yellow solution thus formed had a crystallization temperature of $-20°$ C. (When such a composition is prepared with the use of the same amount of methyldiglycol instead of N-methyl-pyrrolidone, it has a crystallization temperature of $+62°$ C.).

(b) Diazotization of this composition according to the invention can be carried out in simple manner according to the following method: 180 Parts of this composition were stirred into a mixture of 2,400 parts of water and 180 parts of a 32% aqueous hydrochloric acid having a temperature of 15° to 20° C. Subsequently, a solution of 41 parts of sodium nitrite in about 80 parts of water was added rapidly with stirring. The clear diazonium salt solution free from residue so obtained can be suitably applied in ice color dyeing.

(c) For the obtention of a scarlet dyeing on cotton fabric, the operations may be as follows: 20 parts of 2-hydroxynaphthalene-3-carboxylic acid-2'-methoxyphenylamide were introduced into 100 parts of water having a temperature of about 95° C. and containing 27 parts of a 33% aqueous sodium hydroxide solution and 7 parts of a commercial fatty acid/protein degradation product condensate. After cooling to about 60° C. the solution which formed was padded onto a cotton fabric by means of a foulard, the liquor uptake being 70% of the weight of the fabric. Subsequently, the padded goods were dried in usual manner and then slop-padded by means of a further foulard with a developing liquor obtained by mixing 200 parts of the above diazonium salt solution, 6 parts of sodium acetatetrihydrate, 20 parts of 1 60% aqueous acetic acid and 780 parts of water. After a short air passage of the slop-padded goods, a passage in hot water followed, and the goods were then washed as usual in a full width washing machine, and dried. A beautiful scarlet dyeing having good fastnesses was thus obtained.

EXAMPLE 4

According to the indications of Example 3, the following compositions of the invention were prepared:

(a) 450 Parts of 5-nitro-2-methylaniline, 150 parts of a reaction product of 1 mol of castor oil and about 40 mols of ethylene oxide, 400 parts of N-methyl-pyrrolidone.

(b) 400 Parts of 5-nitro-2-methylaniline, 200 parts of a reaction product of 1 mol of castor oil and about 40 mols of ethylene oxide, 400 parts of N-methyl-pyrrolidone.

(c) 333 Parts of 5-nitro-2-methylaniline, 333 parts of a reaction product of 1 mol of castor oil and 40 mols of ethylene oxide, 334 parts of N-methyl-pyrrolidone.

These three compositions had the same good properties as the composition of Example 3. For preparing diazonium salt solutions well suitable for ice color dyeing, operations were as indicated in Example 3, with the use, however, of 202 parts of composition (b) and 243 parts of composition (c) instead of the amounts indicated in Example 3. In each case, clear diazonium salt solutions free from residue were obtained which according to the operation mode of Example 3 (c) gave perfect dyeings.

EXAMPLE 5

700 Parts of 2-nitro-4-amino-1-ethoxybenzene were stirred with 180 parts of N-methyl-pyrrolidone and 120 parts of a reaction product of 1 mol of castor oil and 35 mols of ethylene oxide.

The yellow solution obtained can be diazotized in simple manner according to the following method: 100 parts of the composition were stirred into a mixture of 1,750 parts of water and 130 parts of a 32% aqueous hydrochloric acid having a temperature of about 20° C., subsequently, a solution of 29 parts of sodium nitrite in 44 parts of water was added. A clear diazonium salt solution free from residue was obtained which was well suitable for application in ice color dyeing.

EXAMPLE 6

600 Parts of 2-nitro-4-amino-1-ethylbenzene were stirred with 250 parts of N-methyl-pyrrolidone and 150 parts of a reaction product of 1 mol of castor oil and 38 mols of ethylene oxide. The yellow solution obtained can be diazotized as follows: 150 parts of this composition and subsequently 110 parts of a 25% aqueous sodium nitrite solution were stirred into 1500 parts of a 2.7% aqueous hydrochloric acid having a temperature of about 20° C. A diazonium salt solution free from residue was obtained which was well suitable for application in ice color dyeing.

EXAMPLE 7

300 Parts of 3-nitro-4-amino-1-ethylbenzene, 500 parts of a reaction product of 1 mol of castor oil and 40 mols of ethylene oxide, and 200 parts of N-methyl-pyrrolidone were mixed under stirring. This solution can be diazotized as follows: 100 parts of this composition and subsequently 70 parts of a 20% aqueous sodium nitrite solution were stirred into 1,000 parts of an aqueous 3.3% hydrochloric acid having a temperature of about 20° C. A diazonium salt solution free from residue was obtained which was well suitable for application in ice color dyeing.

EXAMPLE 8

500 Parts of 2-nitro-4-amino-1-methoxybenzene were stirred with 120 parts of a reaction product of 1 mol of castor oil and 36 mols of ethylene oxide, and 380 parts of N-methyl-pyrrolidone. The yellow solution obtained can be converted to a diazonium salt solution suitable for ice color dyeing according to the operation mode described in the above Examples; 1,500 parts of water having a temperature of about 20° C., 100 parts of a 32% aqueous hydrochloric acid and 22 parts of sodium nitrite dissolved in a small amount of water being preferably used for 100 parts of the composition.

EXAMPLE 9

According to Example 3, a composition of the invention was prepared by using instead of 5-nitro-2-methylaniline the same amount of 3-nitro-4-methylaniline. This composition gave also, for example according to the operations as indicated in Example 3, a diazonium salt solution free from residue and very good dyeings according to the ice color technique.

EXAMPLE 10

350 Parts of 2-chloro-5-nitro-1-aminobenzene, 300 parts of a reaction product of 1 mol of castor oil and 35 mols of ethylene oxide, and 350 parts of N-methyl-pyrrolidone were stirred. The yellow solution formed can be converted to a diazonium salt solution well suitable for ice color dyeing (for example according to the indications of Example 3) as follows: 1,000 parts of water having a temperature of about 15° C. were mixed with 185 parts of a 20% aqueous hydrochloric acid, 22.5 parts of a 40% aqueous sodium nitrite solution were then added, and immediately thereafter 100 parts of the composition of this Example were added.

What is claimed is:

1. Liquid compositions of nitro-aniline compounds which contain
   (a) from 20 to 70 weight % of a nitro-aniline compound containing no sulfonic acid and/or carboxylic acid group and having a melting point of below 140° C.;
   (b) from 5 to 80 weight % of an oxethylated castor oil of from 25 to 60 mols of ethylene oxide; and
   (c) from 5 to 65 weight % of N-methyl-pyrrolidone.

2. Compositions according to claim 1, wherein the nitro-aniline compound is unsubstituted or substituted by one or two substituents selected from the group consisting of halogen, alkyl having from 1 to 4 carbon atoms, alkoxy having from 1 to 4 carbon atoms and trifluoromethyl.

3. Compositions according to claim 1, wherein the nitro-aniline compound is a compound of the formula (1)

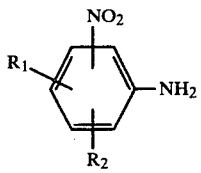

in which $R_1$ is hydrogen, chlorine or fluorine, trifluoromethyl, methyl, ethyl, methoxy or ethoxy, and $R_2$ is hydrogen, chlorine, methyl, ethyl, methoxy or ethoxy, the melting point of these nitro-anilines being below 140° C.

4. Compositions according to claim 1, wherein the nitro-aniline compound is 2-nitro-aniline or 3-nitro-aniline.

5. Compositions according to claim 1, wherein the nitro-aniline compound is 5-nitro-2-methoxyaniline.

6. Compositions according to claim 1, wherein the nitro-aniline compound is 5-nitro-2-methylaniline.

7. Compositions according to claim 1, containing from 30 to 50 weight % of 3-nitro-aniline or 5-nitro-2-methyl-aniline or 5-nitro-2-methoxy-aniline, from 5 to 40 weight % of the above oxethylated castor oil of claim 1, and from 30 to 65 weight % of N-methylpyrrolidone.

8. A process for the preparation of developing liquors or baths for producing water-insoluble azo dyestuffs on the fiber according to the methods of ice color dyeing, which comprises stirring a composition according to one of claim 1 to 7 with aqueous hydrochloric acid, and adding an aqueous solution of sodium nitrite.

* * * * *